Figure 1:
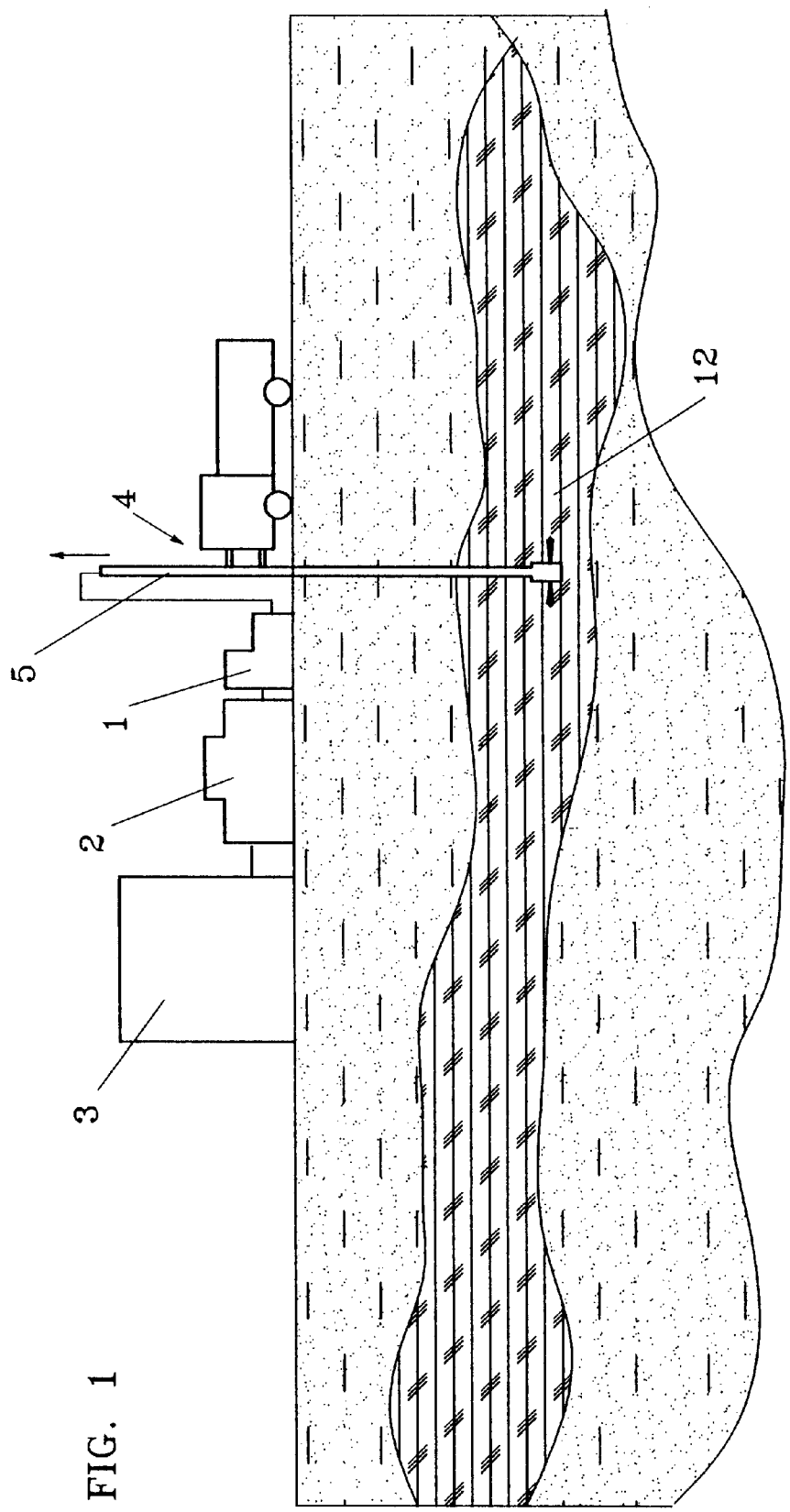

United States Patent
Melegari

Patent Number: 5,944,454
Date of Patent: *Aug. 31, 1999

[54] LAND RECLAMATION METHOD AND EQUIPMENT FOR SOIL INVOLVING THE INTRODUCTION INTO THE SUBSOIL LAYERS OF A HIGH-PRESSURE LIQUID JET TOGETHER WITH A FLUID CONTAINING PARTICLES OF A SOLID AGENT

[76] Inventor: Cesare Melegari, P.zza Garibaldi 11, Colorno (PR), Italy

[ * ] Notice: This patent is subject to a terminal disclaimer.

[21] Appl. No.: 08/890,142

[22] Filed: Jul. 9, 1997

[30] Foreign Application Priority Data

Apr. 18, 1997 [IT] Italy .................. PC97A0006

[51] Int. Cl.$^6$ ..................................... E02D 3/12
[52] U.S. Cl. .................. 405/263; 405/269; 405/266
[58] Field of Search ............ 405/269, 263, 405/266, 267, 232–243

[56] References Cited

U.S. PATENT DOCUMENTS

| Patent No. | Date | Inventor | Class |
|---|---|---|---|
| 3,786,639 | 1/1974 | Pineno et al. | 405/269 X |
| 4,606,675 | 8/1986 | Mitani et al. | 405/269 X |
| 4,624,606 | 11/1986 | Nakanishi et al. | 405/269 |
| 4,659,259 | 4/1987 | Reed et al. | 405/269 X |
| 4,786,212 | 11/1988 | Bauer et al. | 405/269 |
| 4,859,119 | 8/1989 | Chida et al. | 405/267 |
| 4,971,480 | 11/1990 | Nakanishi | 405/269 |
| 5,006,017 | 4/1991 | Yoshida et al. | 405/269 X |
| 5,217,327 | 6/1993 | Nakanishi | 405/269 |
| 5,228,809 | 7/1993 | Yoshida et al. | 405/269 |
| 5,624,209 | 4/1997 | Melegari | 405/269 |

FOREIGN PATENT DOCUMENTS

| | | | |
|---|---|---|---|
| 0012415 | 2/1981 | Japan | 405/269 |
| 58-27364 | 6/1983 | Japan | 405/269 |

Primary Examiner—Dennis L. Taylor
Attorney, Agent, or Firm—Notard & Michalos P.C.

[57] ABSTRACT

A method and apparatus for reclaiming soil has a drilling rod with at least two pipes for injecting a high-pressure fluid and a viscous low-pressure fluid containing a granulated agent into the soil. The high-pressure fluid disaggregates the soil, while the low-pressure fluid carries the granulated agent for treating the soil and injects it into sludge formed by the high-pressure fluid to provide good mixing and distribution of the granulated agent.

10 Claims, 2 Drawing Sheets

LAND RECLAMATION METHOD AND EQUIPMENT FOR SOIL INVOLVING THE INTRODUCTION INTO THE SUBSOIL LAYERS OF A HIGH-PRESSURE LIQUID JET TOGETHER WITH A FLUID CONTAINING PARTICLES OF A SOLID AGENT

This invention relates to a land reclamation method that involves the injection into the subsoil layers of a high-pressure liquid, in particular water, and the introduction of a high viscosity low-pressure fluid containing particles of a solid agent.

In particular the high-pressure liquid is water, and the low-pressure fluid is water added with gelling substances that make the liquid more viscous, said fluid being mixed to granules of a solid agent.

The invention relates to an equipment for performing said method too, and comprises a drilling rod constituted by two coaxial pipes and having, at its head, a couple of radial coaxial nozzles.

The high-pressure liquid is injected through the inner pipe, while the low-pressure fluid, mixed to the granules of the solid agent in suspension, is injected through the outer pipe.

Using the method in accordance with the invention, the soil is drilled to the required depth by a boring drill comprising a probe having at least a radial nozzle, a pipe which supplies said nozzle with a high-pressure fluid and a second pipe through which a low-pressure fluid is conveyed, in particular water added with gelling agents, said low-pressure fluid being mixed with a solid agent and forced out by the said high-pressure fluid, to be mixed with the soil.

Said pipes are preferably coaxial, and the high-pressure fluid is conveyed through the inner pipe.

Due to the high speed at which the mixture exits from the probe nozzle, a disintegration and mixing of the soil is produced which causes the substances required for the treatment to be evenly dispersed in the subsoil layers; as a result, the soil is only treated at the required depth.

The invention is particularly suitable for the reclamation of contaminated soil.

The invention falls into the category of technologies applied to land reclamation, especially for treatment of subsoil layers designed to decontaminate or compact soil so as to create a layer with specific characteristics, such as a given degree of impermeability, or acidity or the like.

Using the method in accordance with the invention, it is possible to inject into soil, or masses of refuses, substances that, by means of physical action (cementation) or chemical action, can stabilize the mass so that it no longer represents a potential danger.

Cases of land pollution are increasingly frequent, especially close to certain factories or sites used as tips for long periods.

The substances which percolate through the soil are often absorbed and dispersed in the subsoil layers and represent a serious source of pollution, causing problems that are difficult to solve.

The known equipments that have been used to reclaim this type of land consist of large helicoid screws fixed to the ends of rods that are inserted into the soil and rotated to mix the soil with substances introduced during the advance of the unit.

With this system it is impossible to treat only one layer of subsoil, e.g., to create an impermeable rodrier or to decontaminate a specific layer only.

It is known (U.S. Pat. No. 4,659,259), a method to mix chemical products with the soil formations. This patent has several inconveniences, due to the fact that it is impossible to treat only a layer of the soil without mixing the soil on the surface too, and requires the use of powerful mechanical equipment.

In this category the documents showing the nearest state of the art are the U.S. Pat. Nos. 5,006,017 in the name of Yoshida and U.S. Pat. No. 5,624,209 of the same applicant.

The Yoshida patent describes a method to consolidate the soil that foresees the injection of a high-pressure agent, for instance concrete, by means of a first nozzle of a drilling rod and the injection of low-pressure recycled mud through a second nozzle of the rod.

The U.S. patent application in the name of Melegari relates to a method for decontaminating the soil by injecting into the soil a high-pressure fluid in order to disintegrate the soil and introducing solid substances dispersed into high-pressure air, that is mixed with the high-pressure liquid that spreads this elements in the layers of the subsoil.

This method is suitable in the case that the solid substances that must be dispersed are very little, preferably not more than 10 micron.

Sometimes it is required the dispersion into the soil of solids having dimensions of some millimeters, so the known methods are not suitable.

In order to obtain a good result, it is needed that the distribution of the solid particles into the carrier is uniform, and this result that can only be obtained when the particles have very small dimensions.

If we consider that for some particular applications, for instance the fixing of heavy metal or hydrocarbons, it is necessary to mix with the soil steel granules having a size of several millimeters, it is easy to understand how the known methods aren't suitable.

It is impossible to obtain a stable and evenly distributed mixture of these solid substances into the air, nor it is possible to mix said solids with the high-pressure fluid since, when the injection pressure is higher than 70–80 bar, phenomena of presso-filtration happen that lead to the rising, inside the pipes, of compact layers that close the passage.

We can only use the known methods when the solid agent is constituted by particles having the size of few microns, or when it is not necessary the use of high-pressure jets to disperse the material into the soil.

To obviate the inconvenience and the limits of the prior art, the present invention proposes a land reclamation method that comprises the injection into the subsoil of a solid agent, wherein a high-pressure (500 bar and more) liquid is injected into the soil, and at the same time a second fluid is injected, in particular water or gelatinized water containing a granulated solid agent.

The gelatinized water is injected at a lower pressure and exits through a nozzle coaxial with the nozzle of the high-pressure water, mixing with this last and being uniformly distributed into the layers of the soil.

Figure 2:
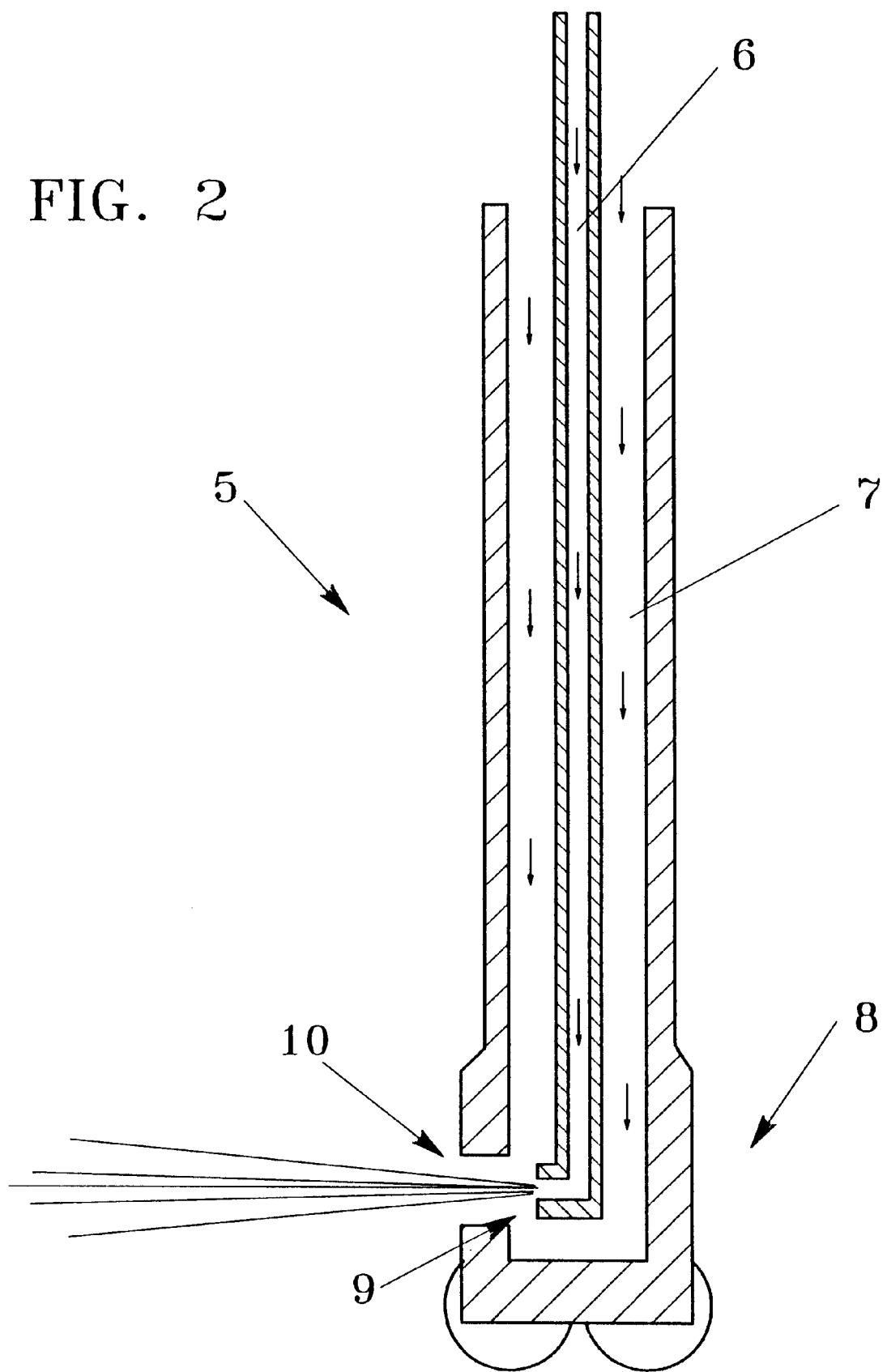

The invention will now be described in detail, by way of example, with to the annexed figures in which:

FIG. 1 schematically shows the equipment in accordance with the invention during the decontaminating stage of a layer of soil;

FIG. 2 schematically illustrates a drilling rod used for the method according to the invention, sectioned along a plane passing through the m axis of the same.

Equipment for land reclamation using the method of the invention is shown in FIG. 1. The apparatus has a high-pressure motor pump 1, a low-pressure motor pump 2, a mixing tank 3 containing a fluid carrier, such as gelantinized water mixed with a granulated solid agent, and a drilling battery 4.

The drilling rod is preferably made of two coaxial pipes 6 and 7 that end, at the drilling bit, with one or more couples of coaxial radial nozzle.

FIG. 2 shows a bit 8 having only two nozzles, respectively 9 and 10.

Preferably the high-pressure liquid, for instance at pressure comprised between 300 and 600, preferably 500 bar, will be pumped along the inner pipe 6, while according with the invention along the outer pipe 7 a low-pressure liquid (50–100 bar, preferably 80 bar) is pumped, mixed with a granulated agent, the granules having dimensions of 4–5 mm or more.

The high-pressure fluid exits from the nozzle 9 at a very high speed (approx. 100–250 meters/sec.), drawing with it a certain amount of low-pressure fluid with the granulated agent due to the Venturi effect.

The two fluids mix, and the kinetic energy transmitted to the particles of solid matter enables them to disintegrate the soil and mix evenly with it.

Another feature of the invention is that a granulated agent is pumped along the outer pipe 7, said granulated agent being mixed with a high density fluid, in particular water added with a gelling agent that gives the fluid the necessary properties (density and viscosity) for maintaining these granules evenly dispersed.

Using this solution we can pump along the outer pipe high density materials, for example steel particles like those sold by the LESS Company (USA), without facing with presso-filtration problems that soon would block the passage all along the pipe because of the accumulation of granules in a compact layer.

For instance good results have been achieved by pumping along the inner pipe water at a pressure of 500 bars and along the outer pipe a mixture made of water, gelling agent AKIFLOC (Mark) and 100 kg/m$^3$ of iron or steel particles.

Using this system (FIG. 1) the soil can be drilled down to the layer 12 to reclaim; at the required depth the rod is then rotated, and the fluid and the solid substances are simultaneously injected through pipes 6 and 7 to begin the reclamation work.

The speed at which the rod is raised and the distance between two adjacent drilling points, which obviously vary from case to case, can be easily determined by an expert in the jet-grounding technology, on the basis of the type of soil and the amount of substances to be mixed.

The type of fluid and solid materials used depends on the job to be performed.

For instance a bit having a diameter of 101 mm was used to reclaim a soil contaminated by aromatic hydrocarbons at a depth of 15 meters.

Once the required depth was reached, the rod was rotated at a speed of 15 rpm, pumping through the inner pipe water at a pressure of 500 bars and pumping through the outer pipe water that had been gelatinized with AKIFLOC6722 (a mixture of high molecular weight organic polymers—produced by Compair Holman), in which an amount of 100 kg/mc of steel particles were mixed ("Hardener Iron" sold by Peerless Metal Powders & Abrasive).

The speed at which the rod raised was 0.20 m/min and the distance between the adjacent drilling was 120 cm.

Analyzing the soil after 10 days, the amount of pollution found in the soil was diminished of about 60–70%.

Using the method according to the invention, the soil can be treated even by reclaiming only selected deep-lying layers of soil having limited thickness, by injecting into the soil a high-pressure liquid and a low-pressure liquid mixed with a granulated agent, which mixes with the high-pressure liquid and is drawn and dispersed in the soil.

This system produces excellent reclamation results with relatively modest equipment limiting the injection of the substances only to the thickness of the soil layer to reclaim.

It also allows the use of big sized and high-density materials, which otherwise would be impossible to be dispersed in the soil using the known techniques.

I claim:

1. A land reclamation method comprising:
   drilling a soil using a drilling rod comprising at least two pipes, each of the at least two pipes having radial nozzles adjacent one end;
   providing a low-pressure fluid comprising a liquid mixed with a granulated agent;
   injecting a high-pressure fluid substantially free of solids through a first pipe of the at least two pipes;
   injecting the low-pressure fluid through a second pipe of the at least two pipes; and
   rotating the drilling rod about its longitudinal axis so that the high-pressure and low-pressure fluids and granulated agent are dispersed in the soil around the drilling rod by the radial nozzles.

2. A land reclamation method according to claim 1, wherein providing the low-pressure fluid further (comprises providing a liquid mixed with gelling agents making the low-pressure fluid viscous, the granulated agent suspended in the low-pressure fluid.

3. An apparatus for land reclamation comprising:
   a drill bit having at least a pair of pipes, each pipe having a radial nozzle adjacent one end;
   high-pressure means for injecting a high-pressure fluid substantially free of solids through one of the at least a pair of pipes; and
   low-pressure means for injecting a low-pressure fluid having a liquid carrier mixed with a granulated agent through a second one of the at least a pair of pipes.

4. An apparatus according to claim 3, further comprising means to mix a gelling agent with the liquid carrier and granulated agent to form a viscous liquid suspending the granulated agent.

5. An apparatus according to claim 4, wherein the at least a pair pipes comprises two concentric pipes.

6. An apparatus according to claim 5, wherein the high-pressure fluid is injected though an inner pipe of the concentric pipes and the low-pressure fluid in injected through an outer pipe of the concentric pipes.

7. A land reclamation method according to claim 2, wherein injecting the high-pressure fluid is done at a pressure of between 300 and 600 bars and injecting the low-pressure fluid is done at a pressure of between 50 and 100 bars.

8. A land reclamation method according to claim 7, wherein injecting the high-pressure fluid is done at a pressure of about 500 bars.

9. A land reclamation method according to claim 7, wherein injecting the low-pressure fluid is done at a pressure of about 80 bars.

10. A land reclamation method according to claim 2, further comprising orienting the fist and second pipes concentric, using the first pipe as the inner pipe carrying the high-pressure fluid and using the second pipe as the outer pipe carrying the low-pressure fluid.

* * * * *